US011254376B2

(12) United States Patent
Mandeville

(10) Patent No.: US 11,254,376 B2
(45) Date of Patent: Feb. 22, 2022

(54) MODULAR TRACK ASSEMBLY

(71) Applicant: HUSQVARNA AB, Huskvarna (SE)

(72) Inventor: Kenneth Mandeville, Weddington, NC (US)

(73) Assignee: Husqvarna AB, Huskvarna (SE)

( * ) Notice: Subject to any disclaimer, the term of this patent is extended or adjusted under 35 U.S.C. 154(b) by 296 days.

(21) Appl. No.: 16/481,274

(22) PCT Filed: May 2, 2018

(86) PCT No.: PCT/IB2018/053046
§ 371 (c)(1),
(2) Date: Jul. 26, 2019

(87) PCT Pub. No.: WO2018/203255
PCT Pub. Date: Nov. 8, 2018

(65) Prior Publication Data

US 2019/0389520 A1 Dec. 26, 2019

Related U.S. Application Data

(60) Provisional application No. 62/500,130, filed on May 2, 2017.

(51) Int. Cl.

| | |
|---|---|
| ***B62D 51/04*** | (2006.01) |
| ***B62D 55/04*** | (2006.01) |
| ***E01H 5/04*** | (2006.01) |
| ***B62D 55/084*** | (2006.01) |

(52) U.S. Cl.
CPC ............ *B62D 51/04* (2013.01); *B62D 55/04* (2013.01); *E01H 5/045* (2013.01); *B62D 55/084* (2013.01)

(58) Field of Classification Search
CPC ........ B62D 51/04; B62D 51/06; B62D 55/04; B62D 55/084; B62D 55/0842; E01H 5/045

(Continued)

(56) References Cited

U.S. PATENT DOCUMENTS 2,529,369 A 11/1950 Beachy
3,318,403 A 5/1967 Hansen
(Continued)

FOREIGN PATENT DOCUMENTS

DE 102007055196 B4 8/2009
EP 0270237 A1 6/1988
(Continued)

OTHER PUBLICATIONS

Swedish Office Action and Search Report for Swedish Application No. 1951015-5, dated Jul. 6, 2020.
(Continued)

*Primary Examiner* — Minnah L Seoh
*Assistant Examiner* — Hosam Shabara
(74) *Attorney, Agent, or Firm* — Burr & Forman, LLP

(57) ABSTRACT

A replacement mobility assembly for a walk-behind, powered device (10) may include first and second drivable components, a mobility assembly frame, and an adaptation assembly. The powered device may be provided with an original mobility assembly (40) that is to be removed from coupling with a drive assembly and a chassis (15) of the powered device prior to installation of the replacement mobility assembly. The first and second drivable components may each be of a different type than corresponding drivable components of the original mobility assembly. The first and second drivable components may be operably coupled to the mobility assembly frame. The adaptation assembly may be configured to enable the mobility assembly frame to be operably coupled to the chassis and the first and second drivable components to be operably coupled to the drive assembly.

24 Claims, 6 Drawing Sheets

(58) Field of Classification Search
USPC ............................................................ 180/11
See application file for complete search history.

(56) References Cited

U.S. PATENT DOCUMENTS

| | | | |
|---|---|---|---|
| 4,496,015 A | 1/1985 | Porter, Jr. et al. | |
| 4,706,769 A | 11/1987 | Latourelle et al. | |
| 4,719,982 A | 1/1988 | Shaver | |
| 6,499,236 B2 | 12/2002 | Yoshida et al. | |
| 9,296,436 B2 * | 3/2016 | Coe, Jr. ................ | B62D 21/186 |
| 2015/0308061 A1 | 10/2015 | Zingelmann, Jr. | |

FOREIGN PATENT DOCUMENTS

| | | | |
|---|---|---|---|
| EP | 2024223 B1 | | 3/2011 |
| JP | S6433478 U | | 3/1989 |
| JP | 2006298267 A | | 11/2006 |
| JP | 2007283915 A | | 11/2007 |
| JP | 2010116056 A | * | 5/2010 |
| JP | 2010116056 A | | 5/2010 |
| JP | 2010116057 A | | 5/2010 |
| JP | 2012005434 A | | 1/2012 |
| WO | 00/06444 A1 | | 2/2000 |
| WO | 03/047953 A2 | | 6/2003 |
| WO | 2016020733 A1 | | 2/2016 |

OTHER PUBLICATIONS

International Search Report and Written Opinion for International Application No. PCT/IB2018/053046 dated Aug. 2, 2018.

* cited by examiner

MODULAR TRACK ASSEMBLY

CROSS REFERENCE TO RELATED APPLICATIONS

This application claims priority to U.S. application Ser. No. 62/500,130 filed May 2, 2017, the entire contents of which are hereby incorporated by reference in its entirety.

TECHNICAL FIELD

Example embodiments generally relate to outdoor power equipment and, more particularly, relate to walk behind power equipment for snow removal that have the capability to be modified with a modular mobility assembly.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers. The snow removal equipment may, in some cases, be operated by a user that walks behind the equipment and is therefore considered walk-behind equipment. However, snow blower or snow thrower attachments can sometimes be added to lawn tractors or other riding yard maintenance vehicles as well.

Walk-behind snow blowers (i.e., snow removal equipment) may be easier to operate and control with a mobility assembly that is powered. Thus, for example, power may be provided from the engine to turn not only the snow removal system of the snow removal equipment, but also power the wheels or tracks (i.e., the mobility assembly) via which the snow removal equipment moves. The operator can then focus more directly on steering and operation of the snow removal equipment instead of being concerned with providing propulsion.

The mobility assemblies of snow removal equipment typically support a chassis or frame that is operably coupled to a bucket inside which impellers or blades for performing the snow removal functions are housed. In most cases, the consumer purchases a model that has a specific mobility assembly (e.g., wheels or tracks) and there is effectively no option for the consumer to change to another type of mobility assembly unless the consumer buys a completely new machine having the corresponding different type of mobility assembly. This can be seen by some consumers as a significant limitation on the configurations that can be achieved by the snow removal equipment and inhibit consumer satisfaction in certain situations.

BRIEF SUMMARY OF SOME EXAMPLES

Some example embodiments may therefore provide the ability to give consumers (or dealers) a greater degree of control with respect to providing options for mobility assemblies for walk behind snow removal equipment. Thus, for example, dealers may sell walk behind snow removal equipment (or other walk behind powered devices for which interchangeable mobility assemblies may be desirable) with the option for the consumer to select a desired type of mobility assembly. Alternatively, dealers may offer consumers with the option to retrofit or upgrade their equipment with new types of mobility assemblies. Finally, in some cases, consumers may be able to select and alternate between different types of mobility assembly based on current conditions or their own preferences. Provision of a removable mobility assembly may also improve the serviceability of the snow removal equipment by providing improved access to portions of the snow removal equipment that may require servicing.

In one example embodiment, a walk-behind, powered device is provided. The device may include a power unit, a chassis supporting the power unit, a working assembly operably coupled to the power unit to perform a working function responsive at least in part to operation of the power unit, and a drive assembly configured to transfer power to a first mobility assembly to provide mobility of the powered device. The first mobility assembly may be removable and replaceable with a second mobility assembly, the second mobility assembly being a different type of mobility assembly than the first mobility assembly.

In another example embodiment, replacement mobility assembly for a walk-behind, powered device may be provided. The replacement mobility assembly may include first and second drivable components, a mobility assembly frame, and an adaptation assembly. The powered device may be provided with an original mobility assembly that is to be removed from coupling with a drive assembly and a chassis of the powered device prior to installation of the replacement mobility assembly. The first and second drivable components may each be of a different type than corresponding drivable components of the original mobility assembly. The first and second drivable components may be operably coupled to the mobility assembly frame.

The adaptation assembly may be configured to enable the mobility assembly frame to be operably coupled to the chassis and the first and second drivable components to be operably coupled to the drive assembly.

In still another example embodiment, an adaptation assembly for a replacement mobility assembly for a walk-behind, powered device may be provided. The powered device may be provided with an original mobility assembly that is to be removed from coupling with a drive assembly and a chassis of the powered device prior to installation of the replacement mobility assembly. The adaptation assembly may include a first track gear and a second track gear operably coupled to respective ones of a first drivable component and a second drivable component of the replacement mobility assembly, a first transmission gear and a second transmission gear operably coupled to respective portions of the drive assembly to transfer power from a power unit of the powered device to the first and second track gears, respectively, and a mobility assembly frame to which the first and second drivable components, the first and second track gears, and the first and second transmission gears are operably coupled. The adaptation assembly may be configured to enable the mobility assembly frame to be operably coupled to the chassis and the first and second drivable components to be operably coupled to the drive assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2:
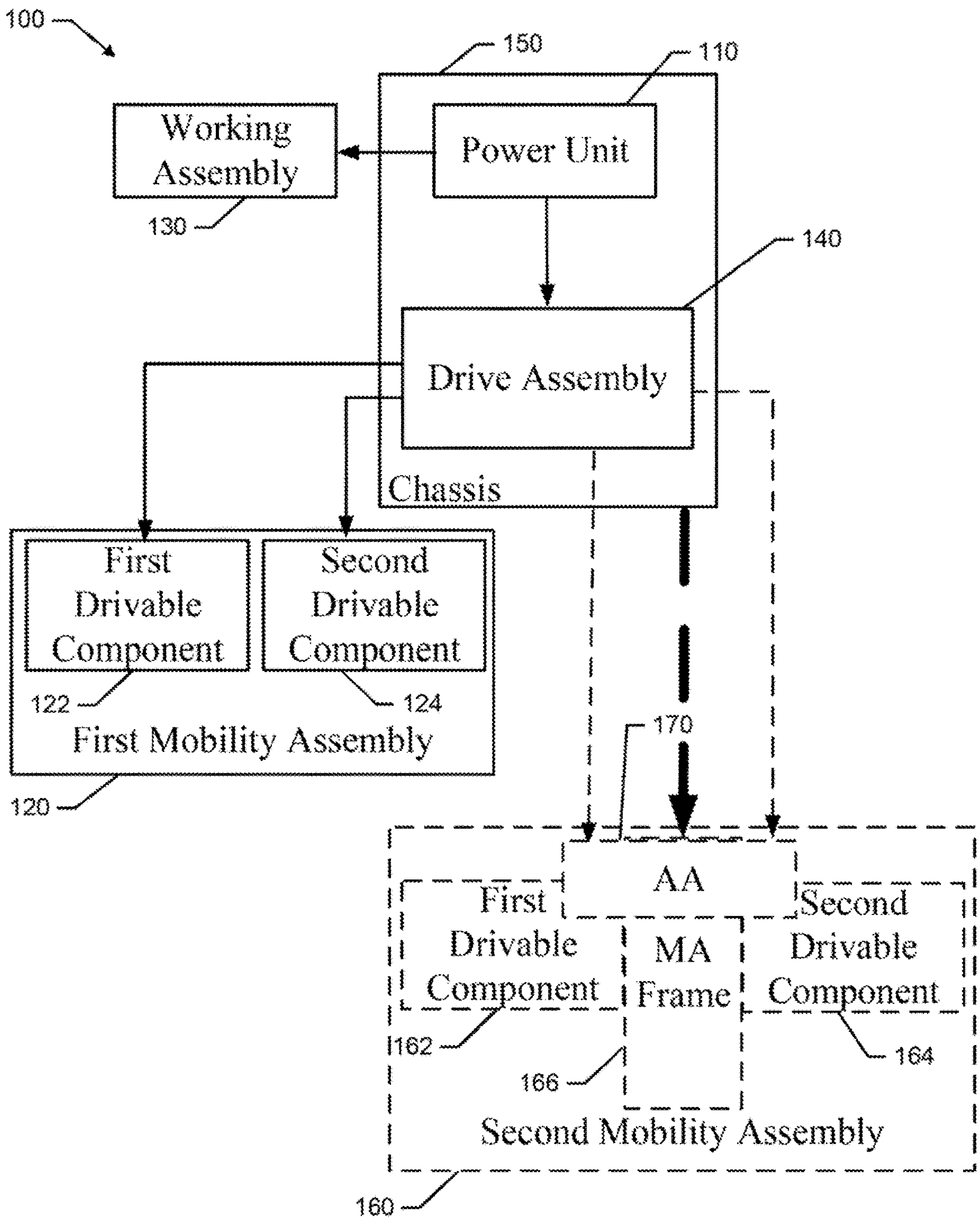
FIG. 2 illustrates a block diagram of a walk-behind, powered device according to an example embodiment.
Figure 3A:
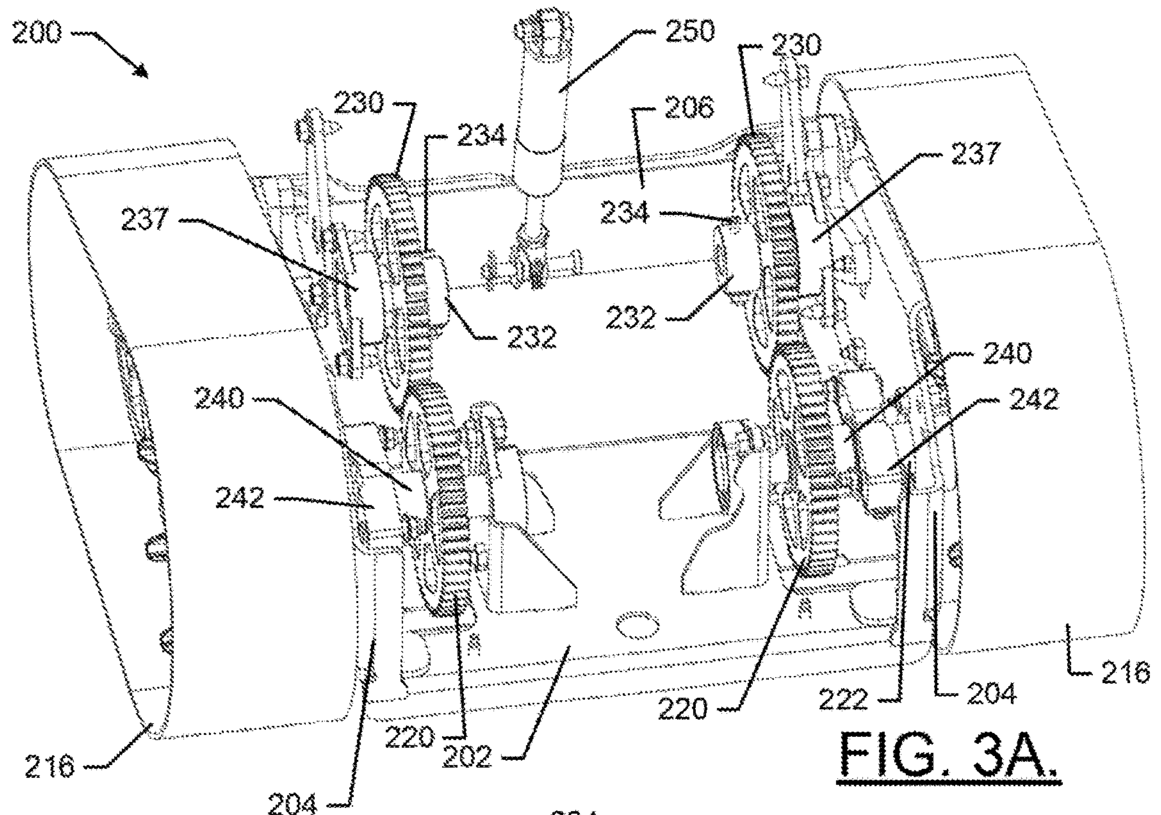
Figure 3B:
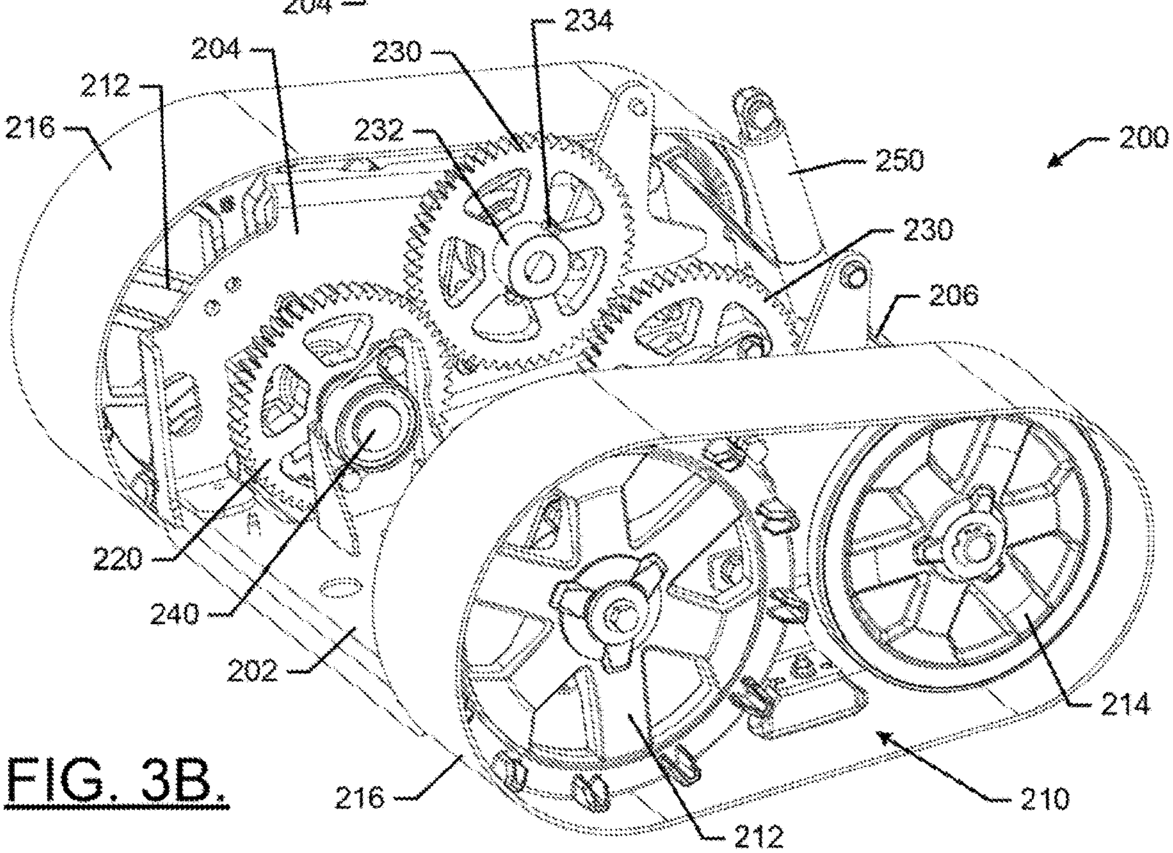
Figure 4:
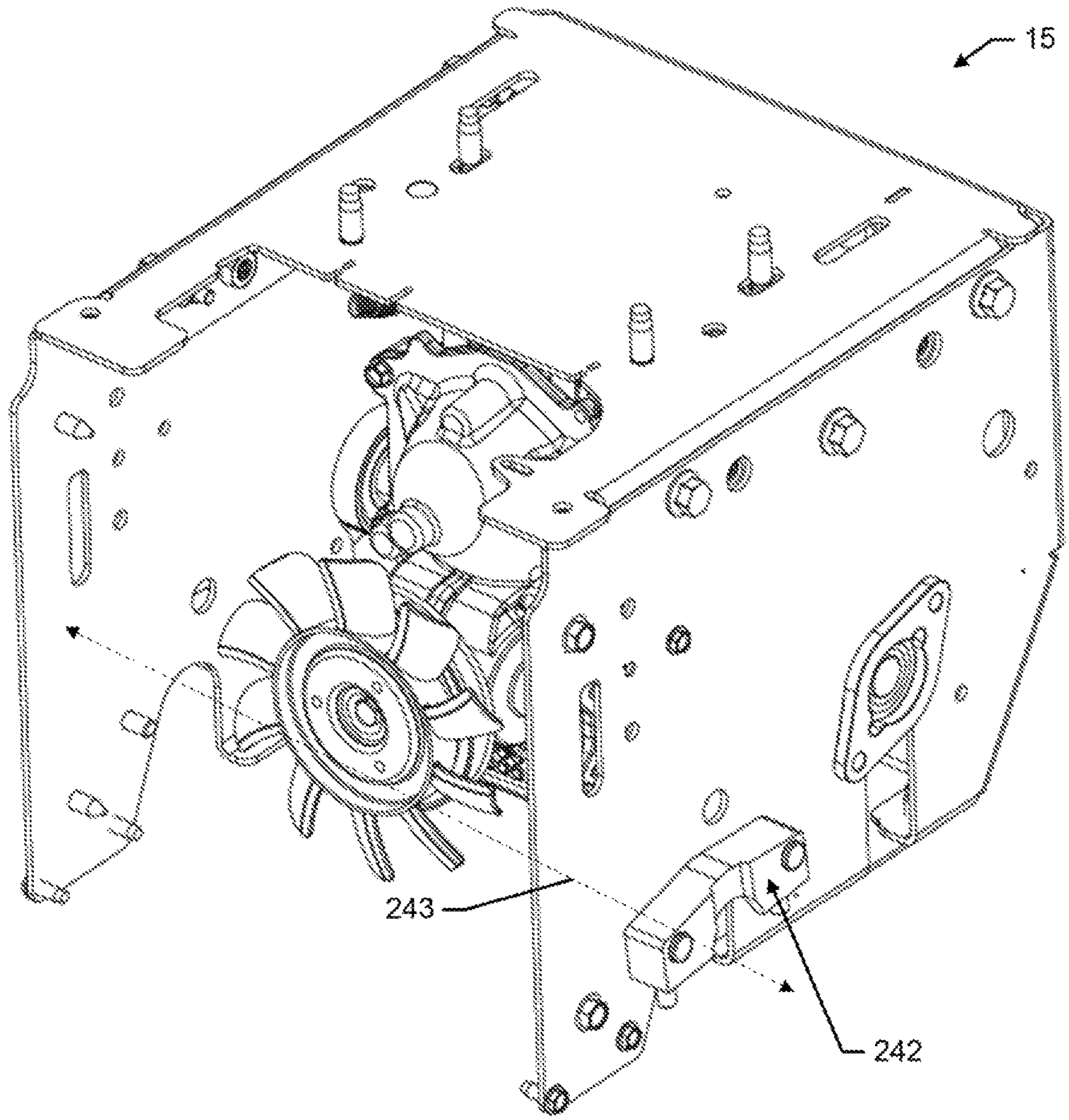
Figure 5:
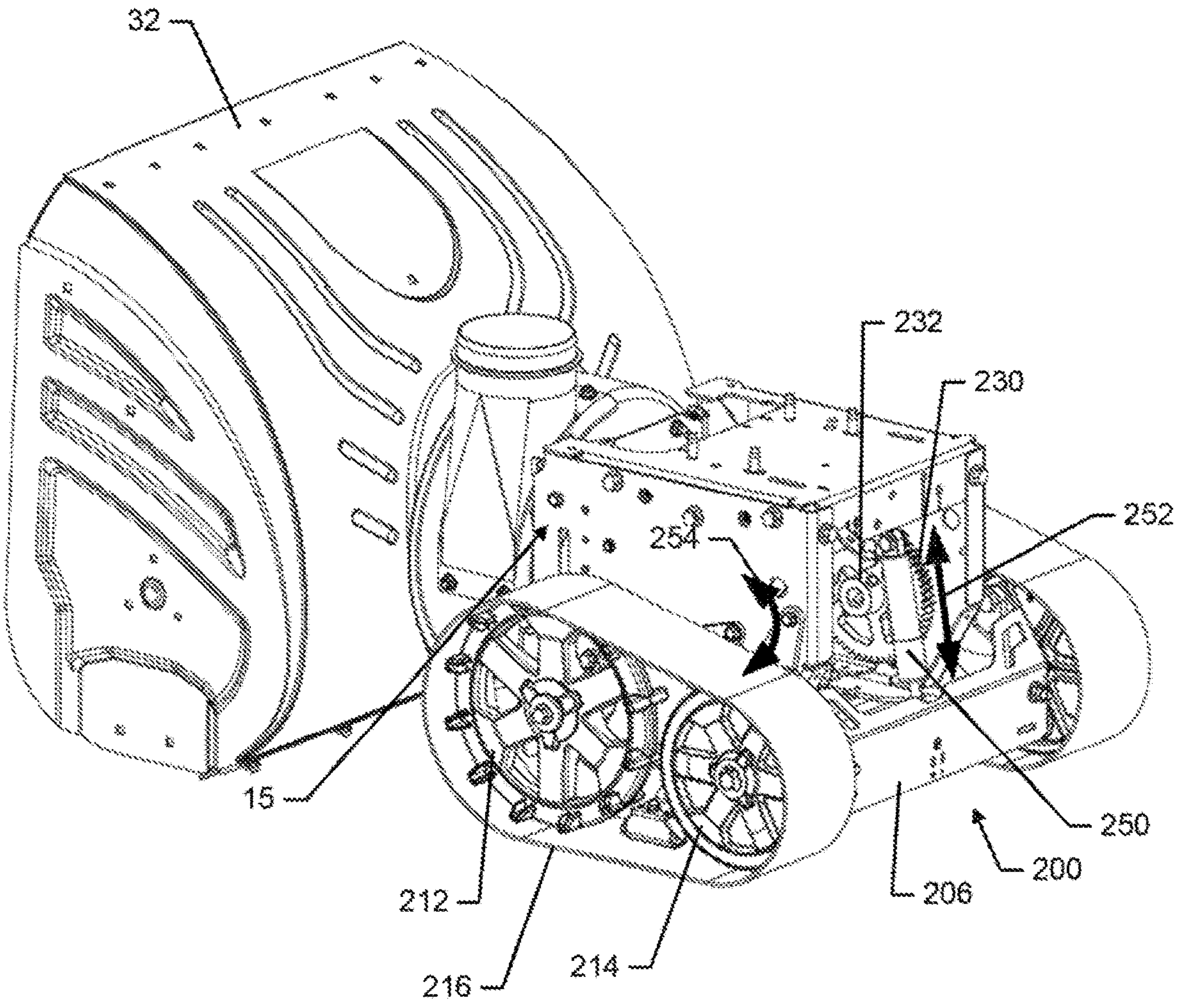
Figure 6:
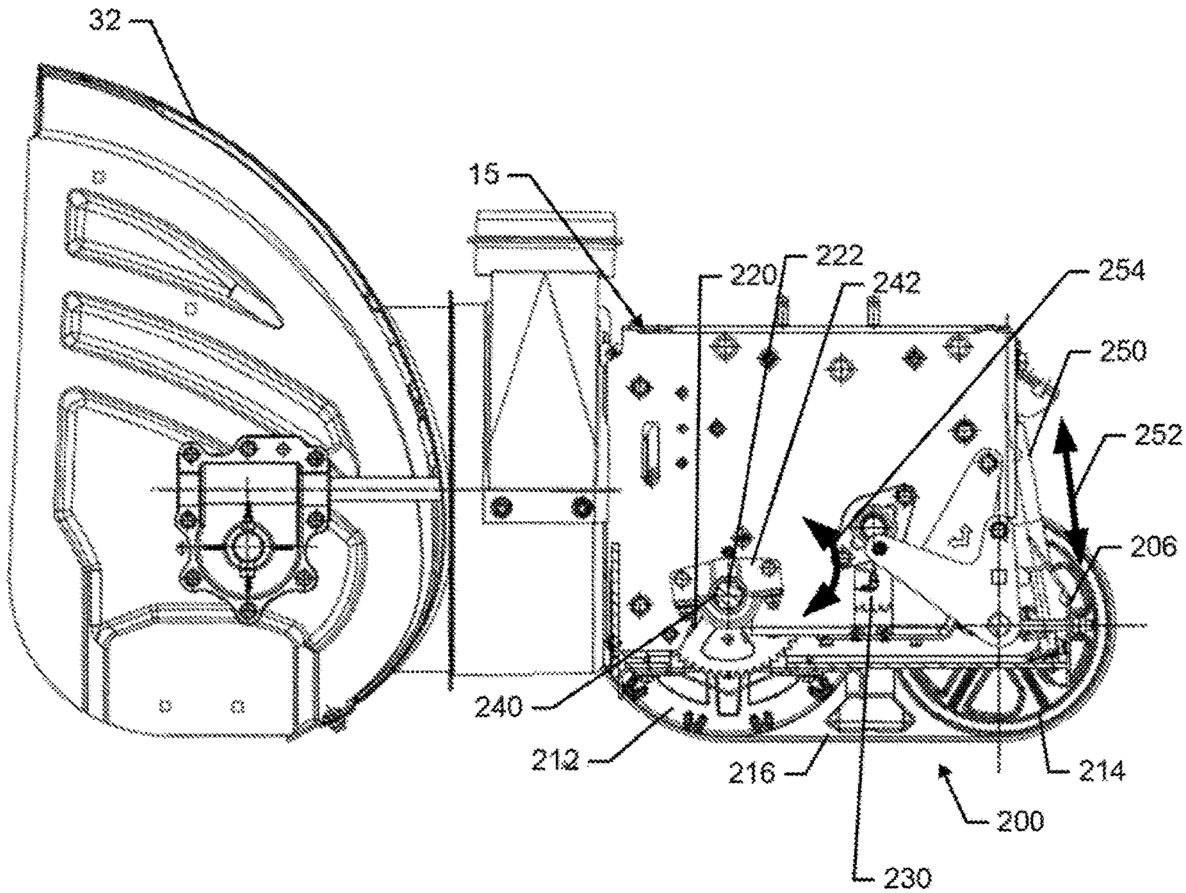

FIG. 3, which is defined by FIGS. 3A and 3B, illustrates two different perspective views of one configuration that may be used to embody various ones of the components described above in reference to FIG. 2 in accordance with an example embodiment;

FIG. 4 illustrates a perspective view of external and some internal portions of a chassis in accordance with an example embodiment;

FIG. 5 illustrates a perspective view of one example instance of various components of an adaptation assembly for enabling a replacement mobility assembly to be added to the powered device according to an example embodiment; and FIG. 6 illustrates a cross sectional view of various components of the adaptation assembly of FIG. 5 according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For a snow blower or snow thrower (i.e., snow removal equipment), or other walk behind devices that employ a working assembly attached to the chassis of the device, and for which powered mobility is provided, the device is typically sold or at least initially assembled with a given type of mobility assembly. However, consumers or dealers may wish to have the ability to employ a different type of mobility assembly without having to purchase an entirely new device. Accordingly, some example embodiments described herein may provide a kit for upgrade or replacement of one mobility assembly with a different type of mobility assembly. In this regard, for example, some embodiments may provide a modular track assembly as an example of a kit or assembly for modification of the device to change the mobility assembly from a wheeled configuration to a track configuration in a relatively easy and accessible way. Thus, for example, the wheeled configuration may be the original mobility assembly and the modular track assembly may be a kit or module for upgrading the original mobility assembly with a replacement mobility assembly.

Figure 1:
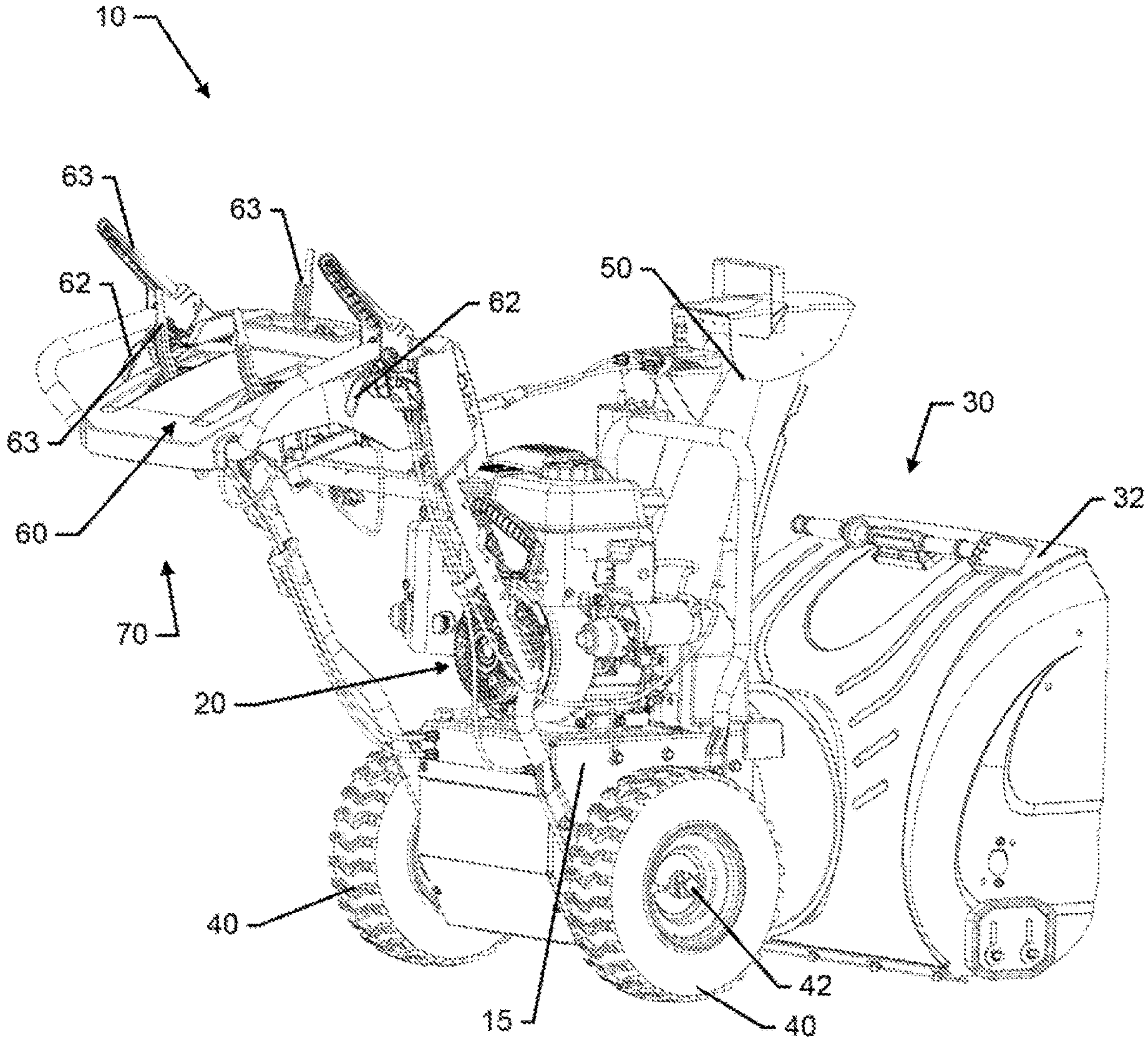
FIG. 1 illustrates a perspective view of a snow removal device according to an example embodiment.

FIG. 1 illustrates an example of a walk behind, powered device in the form of a snow removal device 10. Although the snow removal device 10 of FIG. 1 is shown as a walk-behind snow removal device (i.e., a snow blower or snow thrower), it should be appreciated that example embodiments could be employed in connection with other walk behind power equipment as well, such as tillers, mowers, edgers, and/or the like, particularly in cases where the equipment has a fixed relationship between a chassis of the equipment and the working assembly of the equipment, with the option to alter the orientation of the working assembly relative to the mobility assembly.

In some embodiments, the snow removal device 10 may include a chassis 15 or frame to which various components of the snow removal device 10 may be attached. For example, the chassis 15 may support an engine 20, such as a gasoline powered engine, and a working assembly 30. In some cases, the engine 20 may fit substantially on top of or even inside the chassis 15. Operation of the engine 20 may be initiated by a recoil starter via pulling of a recoil starter handle by the operator. However, in other embodiments, the engine 20 may alternatively be started via a key, switch or other similar device. Electrically powered machines are also contemplated within the scope of example embodiments. Thus, the engine 20 may be embodied as an electric motor in some cases.

The snow removal device 10 may include wheels 40 or continuous tracks forming a mobility assembly on which a substantial portion of the weight of the snow removal device 10 may rest, when the snow removal device 10 is stationary. The mobility assembly (e.g., the wheels 40 or continuous tracks) may also provide for mobility of the snow removal device 10. In some cases, the mobility assembly may be driven via power from the engine 20. In such an example, the engine 20 may be operably coupled to a drive shaft 42 to which the wheels 40 are mounted so that when the drive shaft 42 is turned by the engine 20, the wheels 40 are also turned. However, in other cases, the mobility assembly may simply provide for mobility of the snow removal device 10 responsive to pushing by the operator. In other words, for example, the mobility assembly may be an active or passive provider of mobility for the snow removal device 10. In some embodiments, the mobility assembly may selectively provide forward or reverse power to each of the wheels 40. The selective provision of power to the wheels 40 means that, for example, one wheel could be powered while the wheel on the opposite side is not powered. However, in some cases, braking forces may also be provided to the wheel that is not powered to improve the ability of the operator to control a tight turn with minimal physical effort. This feature may enhance turning capabilities and general control capabilities for the snow removal device 10.

In this example, the working assembly 30 may be a dual stage snow thrower. As such, the working assembly 30 includes a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. However, it should be appreciated that the working assembly 30 of some embodiments could include a power brush or other implement used to move snow toward a second stage device (e.g., the impeller) for ejection from the working assembly 30. The working assembly 30 could also include a single stage auger or impeller or structures for performing another work function (e.g., a blade for mowing or edging, or a tine assembly for tilling). In an example embodiment, the working assembly 30 may be powered via operable coupling to the engine 20. The operable coupling of the working assembly 30 to the engine 20 may be selectively engaged and/or disengaged (e.g., via a clutch, one or more selectively engageable chains/belts/pulleys, a friction wheel or other similar devices). Components of the working assembly 30 (e.g., the auger and the impeller) may be housed in a bucket assembly 32 (or bucket).

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and a discharge chute 50. As such, for example, the ejection path may begin proximate to an input of the impeller, at which point snow is imparted with momentum at an output of the impeller to be pushed toward, and ultimately through, the discharge chute 50.

In an example embodiment, the snow removal device 10 may further include a control panel 60, which may include ignition controls, operating levers (e.g., operating triggers 62) and/or other operator controls or informational gauges. The control panel 60 may be provided to be accessible from the rear of the powered device 10 by an operator standing or walking behind the snow removal device 10 (e.g., at an operating station) and capable of pushing, steering or otherwise controlling movement of the snow removal device 10 using a handlebar assembly 70 or some other steering assembly. In some examples, various ones of the operating triggers 62 may be employed to control various components of the mobility assembly and/or the working assembly 30. As such, for example, different ones of the operating triggers 62 may be operably coupled to various components to enable remote operator control of the respective components. In an example embodiment, operation of the operating triggers 62 may selectively engage or disengage drive power to the wheel on the same side as the corresponding operating trigger 62. Moreover, in some cases, operation of the operating triggers 62 may initiate braking. Thus, for example, the operating triggers 62 may be examples of a remote actuator capable of a single actuation to both remove drive power and simultaneously apply braking power to one of the drivable components.

The control of various other functions or operations of the snow removal device 10 may be controlled by corresponding ones of various other control operators 63 or levers. Each control operator 63 may have a corresponding function that is executable by actuation of the corresponding control operator 63. For example, control operators 63 may be used to orient the discharge chute 50, engage power-propelled forward or reverse motion of the snow removal device 10, control height adjustments as described herein, or perform other functions.

Since, as indicated above, the snow removal device 10 of FIG. 1 is merely one example of a device on which example embodiments may be practiced. FIG. 2 is provided to facilitate a more general description of devices on which an example embodiment may be practiced. In this regard, FIG. 2 illustrates a block diagram of a powered device 100 in accordance with an example embodiment. It should be appreciated that the snow removal device 10 is one specific example of the powered device 100.

As shown in FIG. 2, the powered device 100 may include a power unit 110 and a first mobility assembly 120. The first mobility assembly 120 may be operably coupled to the power unit 110 to enable the powered device 100 to move over a ground surface upon which the powered device 100 is operable. Although the first mobility assembly 120 may enable the operator to move the powered device 100 without power being applied to the first mobility assembly 120 from the power unit 110 (e.g., when the operator pushes the powered device 100), the power unit 110 may at least be capable of providing power to the mobility assembly 120. The engine 20 described above is one example of the power unit 110 of FIG. 2.

The first mobility assembly 120 may include a first drivable component 122 and a second drivable component 124. The first and second drivable components 122 and 124 may be wheels (e.g., the wheels 40 of FIG. 1), or any other suitable components of a first type that can be powered to cause the powered device 100 to move over the ground. In an example embodiment, the first and second drivable components 122 and 124 may be operably coupled to a drive shaft (e.g., drive shaft 42 of FIG. 1) that may include a bush/sleeve or other component to split the drive shaft so that each of the first and second drivable components 122 and 124 is independently drivable. As such, the first and second drivable components 122 and 124 may be provided on opposite sides of the powered device 100.

The powered device 100 may further include a working assembly 130 (an example of which is the working assembly 30 of FIG. 1). The working assembly 130 may be operably coupled to the power unit 110 to perform a working function responsive at least in part to operation of the power unit 110. As mentioned above, the working assembly 130 could perform working functions such as snow removal, mowing, edging, tilling and/or the like.

In an example embodiment, the powered device 100 may further include a drive assembly 140 that may provide the operable coupling between the power unit 110 and the first mobility assembly 120 (e.g., via the drive shaft). The drive assembly 140 may include a transmission, friction drive, and/or other components (e.g., a hydraulic system) configured for transferring power from the power unit 110 to the first mobility assembly 120 via the drive shaft. As such, the drive assembly 140 may selectively provide forward drive power or reverse drive power to the first mobility assembly 120. In this regard, for example, the drive assembly 140 may transfer rotary power through a series of gears, frictionally engaged components, and/or the like to the first and second drivable components 122 and 124 to turn the first and second drivable components in a desired direction (i.e., forward or reverse). In a first configuration, the drive assembly 140 may provide no power to either of the first and second drivable components 122 and 124 (so the operator can push the powered device 100), or provide power to both of the first and second drivable components 122 and 124, simultaneously in the same direction (i.e., forward or reverse). While it is also possible to provide power to only one of the first or second drivable components 122 and 124 while no power is provided to the other, some example embodiments may further provide the ability to provide braking forces simultaneously to the first drivable component 122 while drive power is being provided to the second drivable component 124 (or vice versa). Providing combined braking and power in this manner may enable a very tight turn capability (e.g., a near zero turning radius). In still other embodiments, power may be applied to both of the first and second drivable components 122 and 124 simultaneously, but in opposing directions.

In accordance with an example embodiment, the drive assembly 140 and the power unit 110 may each be supported by (and inside, in some cases) a chassis 150 (e.g., chassis 15 of FIG. 1). The chassis 150 may include at least one opening on each opposing side thereof for the drive shaft to pass therethrough to engage the first and second drivable components 122 and 124. In some cases, the chassis 150 may be rigidly connected to the working assembly 130 so that the working assembly 130 effectively has a fixed orientation relative to the chassis 150. Accordingly, in order to change the interaction between the working assembly 130 and the ground, the chassis 150 may be adjusted relative to the first mobility assembly 120 using a height adjuster as described in greater detail below.

Meanwhile, to provide a capability for changing from the first mobility assembly 120 to a different type of mobility assembly, an upgrade kit or replacement assembly may be provided having a second mobility assembly 160. The second mobility assembly 160 may include a first drivable component 162 and second drivable component 164 (e.g., track assemblies) that may be operably coupled to the powered device 100 (and operated) as an alternative to the first mobility assembly 120, but otherwise interact with the powered device 100 in a substantially similar manner to that which has been described above in reference to the first mobility assembly 120. However, some differences may exist, which will now be discussed.

As an example, and to facilitate modularization or kitting of the second mobility assembly 160, the first and second drivable components 162 and 164 of the second mobility assembly 160 may be operably coupled to a mobility assembly frame 166 that is configured to be operably coupled to the chassis 150. The mobility assembly frame 166 may therefore include several of the components that form the second mobility assembly 160, and also be configured to mate with the chassis 150. As such, the mobility assembly frame 166 may be pre-configured, packaged and/or sold to include all components associated with replacement of the first mobility assembly 120 with the second mobility assembly 160. In particular, the first and second drivable components 162 and 164 may be mounted on the mobility assembly frame 166 and an adaptation assembly 170 may be provided to facilitate operable coupling of the second mobility assembly 160 to the chassis 150 after the first mobility assembly 120 has been removed.

The second mobility assembly 160 (along with components thereof and connections thereto) are shown in dashed lines in FIG. 2. The dashed lines are meant to signify that, during an initial configuration, the first mobility assembly 120 is operably coupled to the drive assembly 140 to form the powered device 100 and the second mobility assembly 160 is not attached. Meanwhile, after the first mobility assembly 120 is decoupled from the drive assembly 140 and removed from the powered device 100, the second mobility assembly 160 and the components thereof may be connected as shown by the dashed lines connecting the second mobility assembly 160 to the chassis 150 and the drive assembly 140 in an alternative configuration.

As shown in FIG. 2, the first and second drivable components 162 and 164 may each be operably coupled to respective portions of the adaptation assembly 170 via the mobility assembly frame 166. In some cases, the mobility assembly frame 166 may also be operably coupled (e.g., pivotally connected) to the chassis 150 via a portion of the adaptation assembly 170. The mobility assembly frame 166 may extend around a bottom portion of the chassis 150 such that, for example, the chassis 150 substantially fits within the mobility assembly frame 166 and the adaptation assembly 170 may facilitate some or all of the connections that the chassis 150 and drive assembly 140 have made between themselves and the first and second drivable components and/or the mobility assembly frame 166.

FIGS. 3A and 3B illustrate perspective views of specific components that may be used to embody various ones of the components described above in reference to FIG. 2. In this regard, FIG. 3A illustrates a front perspective view of a mobility assembly frame 200 that is an example of the mobility assembly frame 166 of FIG. 2. Meanwhile, FIG. 3B illustrates a side perspective view of all components of the second mobility assembly 160 of FIG. 2 in accordance with an example embodiment. The mobility assembly frame 200 may include a bottom wall 202, side walls 204 and a rear wall 206. Each of the walls of the mobility assembly frame 200 may be formed from sheet metal or another rigid structure.

Before proceeding to describe the attachment of the mobility assembly frame 200 to the chassis 15 of FIG. 1 in replacement of the wheels 40, the removal of the wheels 40 will be described. In this regard, in an example embodiment, each of the wheels 40 may be removed from the drive shaft 42. In particular, for example, the wheels 40 may be mounted to a hub or sleeve that can be operably coupled to the drive shaft 42 by a bolt, pin or other retaining member. By removing the retaining member (which may pass through the hub or sleeve and also through the drive shaft 42), the wheels 40 may be removable from the drive shaft 42. The drive shaft 42 may then be exposed and available to be operably coupled to the second mobility assembly 160 of FIG. 2 via the mobility assembly frame 200 of FIGS. 3A and 3B.

As shown in FIGS. 3A and 3B, the first and second drivable components 162 and 164 may each be embodied by a corresponding track assembly 210 including a first track wheel 212, a second track wheel 214 and a continuous track 216 that is operably coupled to the peripheries of the first and second track wheels 212 and 214. The first track wheels 212 may each be operably coupled to a corresponding track gear 220 via a corresponding stub shaft 222. The second track wheels 214 may, in this example, be configured to free wheel with movement of the continuous track 216. Thus, for example, only the first track wheels 212 may be directly powered, and the second track wheels 214 may be indirectly powered via the continuous track 216. Sizes of the first and second track wheels 212 and 214 shown in FIGS. 3A and 3B are merely exemplary and, in alternative embodiments other sizes could be included. Thus, the size differences could be reversed, the first and second track wheels 212 and 214 sizes could be the same, or entirely different size ratios could be employed. Moreover, in some cases, additional track wheels (e.g., third, fourth, etc.) could also be employed.

The stub shafts 222 may extend from their respective track gears 220 through the side walls 204 of the mobility assembly frame 200 to lie alongside the sides of the chassis (e.g., chassis 15 of FIG. 1), upon removal of the wheels 40 so that the mobility assembly frame 200 can be attached instead of the wheels 40. The mobility assembly frame 200 may also be operably coupled to or otherwise include respective transmission gears 230. The transmission gears 230 may be mounted on or otherwise operably coupled to a hub sleeve 232. The hub sleeves 232 of the transmission gears 230 may face each other and may be configured to receive the drive shaft 42. Moreover, each of the hub sleeves 232 may be affixed to the drive shaft 42 via a retaining member 234 (e.g., a bolt, pin, or other such fixing member). When the hub sleeves 232 are affixed to the drive shaft 42, the hub sleeves 232 turn with the drive shaft 42 to correspondingly turn the transmission gears 230. Each transmission gear 230 then correspondingly turns its respective track gear 220 to turn the stub shafts 222 and the first track wheels 212.

As can be seen from FIGS. 3A and 3B, the transmission gears 230 and track gears 220 mirror each other about a longitudinal centerline of the mobility assembly frame 200.

As such, transmission gears 230 and track gears 220 (and other mirrored components) could be distinguished with descriptors such as right and left or first and second (i.e., first and second transmission gears and corresponding first and second track gears). Additionally, as also shown in FIGS. 3A and 3B, the transmission gears 230 may be disposed between rotational bearings 237 and the hub sleeves 232.

In an example embodiment, pivot bearings 240 (e.g., a right side pivot bearing and left side pivot bearing) may be provided to operably couple the chassis 15 to the mobility assembly frame 200. In particular, the pivot bearings 240 may each be allowed to pivot generally about a common axis (e.g., pivot axis 243 of FIG. 4) to that of the stub axle 222. The pivot bearings 240 may be operably coupled to pivot bearing receivers 242 that are disposed on respective sides of the chassis 15.

In the example of FIGS. 3A and 3B, the track gears 220 and transmission gears 230 engage each other along a periphery thereof, and have substantially a 1:1 gear ratio. However, other gear ratios could be employed in alternative example embodiments. Thus, for example, the transmission gear 230 could be either larger or smaller than the track gear 220 with any desirable gear ratio therebetween being employed.

FIG. 4 illustrates the chassis 15 and the position of the pivot bearing receivers 242 on the sides of the chassis 15, and the corresponding location of the pivot axis 243. FIG. 5 illustrates a rear perspective view of the chassis 15 and the mobility assembly frame 200. FIG. 6 illustrates a cross section view of the chassis 15 and the mobility assembly frame 200 to show internal positions of various components. As can be appreciated from FIGS. 3A, 3B, 4, 5 and 6, the pivot bearings 240 may combine to form two points of three attachment points that are provided between the chassis 15 and the mobility assembly frame 200. The third attachment point may be provided via a height adjuster 250 that is operably coupled between the chassis 15 and the mobility assembly frame 200 at respective rear portions thereof. In particular, as can be seen in FIGS. 3A and 3B, one end of the height adjuster 250 may be pivotally attached to the rear wall 206 of the mobility assembly frame 200. The other end of the height adjuster 250 may be pivotally attached to a top and rear portion of the chassis 15. Accordingly, as the length of the height adjuster 250 is changed, the chassis 15 may pivot about the pivot bearings 240 to adjust an orientation of the working assembly relative to the ground. The height adjuster 250 may be disposed at a longitudinal centerline of the mobility assembly frame 200 and substantially equidistant from each of the pivot bearings 240 to provide for a balanced structure. Moreover, the pivot bearings 240 may be disposed proximate to a center of gravity of the chassis 15 so that the chassis 15 can pivot about the pivot bearings 240 with relatively small amounts of force applied. This further enables the height adjuster 250 to hold the position of the chassis 15 relative to the mobility assembly frame 200 with relatively smaller amounts of force so that a smaller component can be used as the height adjuster 250.

As shown in FIGS. 5 and 6, when the length of the height adjuster 250 is lengthened or shortened as indicated by the arrow 252, the chassis 15 pivots about the pivot bearings 240 (as shown by arrow 254). In an example embodiment, the height adjuster 250 may be a gas strut, or gas/air cylinder. Furthermore, in some embodiments, the height adjuster 250 may be remotely operable based on remote actuation of an actuation valve (e.g., a two way valve or actuator). The actuation valve may be operated such that the actuation valve may be opened to enable pressurized gas or air within the air cylinder (of the height adjuster 250) to be moved in either direction through the two way valve to permit movement of a plunger disposed to separate two compartments of the air cylinder in either direction (e.g., toward either of the separate compartments). When the actuation valve is closed, fluid (e.g., oil) or air may be locked in each separate compartment of the air cylinder to fix a position of at least one shaft extending out of an end of the air cylinder from the plunger. The shaft extending out of one end (or both ends) of the air cylinder may therefore elongate or contract the length of the height adjuster 250 dependent upon a position of the internal plunger as described above in order to adjust a distance between the corresponding portions of the chassis 15 and mobility assembly frame 200 along the entire range of motion of the shaft. In this regard, for example, the height adjuster 250 may extend between respective portions of the chassis 15 and mobility assembly frame 200 to define a distance therebetween and correspondingly define a height or level of the working assembly (e.g., bucket assembly 32) relative to the ground.

In an example embodiment, the air pressure locked in each compartment of the height adjuster 250 may be allowed to momentarily increase or decrease to dampen shocks/vibrations. However, responsive to a shock increasing pressure in one compartment, the increasing pressure may exert a force in an opposing direction to tend to return the height adjuster 250 to its prior steady state position. Accordingly, the height adjuster 250 may decouple (or at least inefficiently couple) the chassis 15 and mobility assembly frame 200 relative to shock and/or vibration in addition to controlling their relative orientation.

The number and location of the positions at which the plunger may be fixed within the air cylinder (e.g., by closure of the actuation valve) may not be predefined. As such, the plunger may be disposed at any of an infinite number of potential locations within the confines of the air cylinder. This means that the height adjuster 250 is not limited to being fixable at discrete intervals since the air cylinder does not have any discrete fixing points therein. Having a capability for non-discrete fixing locations, or infinite number of fixing points along the range of motion of the height adjuster 250, may provide an advantage to operators that might otherwise find that one fixed position is too high, while the next available fixed position is too low. Furthermore, the ability to remotely actuate the plunger position may further provide an operator with the ability to adjust the height of the working assembly (e.g., bucket assembly 32) without leaving the operator station and without the use of tools.

Thus, as can be appreciated from FIGS. 3A to 6, the adaptation assembly 170 of FIG. 2 may include the height adjuster 250, the track gears 220, the transmission gears 230, and the pivot bearings 240, all of which may combine to allow the wheels 40 to be removed so that the mobility assembly frame 200 (or 166) can be installed to replace the first mobility assembly 120 (of a first type) with the second mobility assembly 160 (of a second, and different type). Whereas the first mobility assembly 120 operably couples the first and second drivable components 122 and 124 thereof directly to the drive assembly 140, the second mobility assembly 160 does not directly connect the first and second drivable components 162 and 164 thereof to the drive assembly 140. Instead, the adaptation assembly 170 is employed to indirectly couple the drive assembly 140 to the first and second drivable components 162 and 164. The adaptation assembly 170 further pivotally couples the mobility assembly frame 200 (or 166) to the chassis 150 (or 50).

Thus, a walk-behind, powered device in accordance with an example embodiment may include a power unit, a chassis supporting the power unit, a working assembly operably coupled to the power unit to perform a working function responsive at least in part to operation of the power unit, and a drive assembly configured to transfer power to a first mobility assembly to provide mobility of the powered device. The first mobility assembly may be removable and replaceable with a second mobility assembly, the second mobility assembly being a different type of mobility assembly than the first mobility assembly.

The powered device (or replacement mobility assembly) of some embodiments may include additional features that may be optionally added either alone or in combination with each other. For example, in some embodiments, (1) the first mobility assembly may include a first wheel operably coupled to the drive assembly on a first side of the chassis and a second wheel operably coupled to the drive assembly on a second side of the chassis. In an example embodiment, (2) the second mobility assembly may include a first track assembly operably coupled to the drive assembly on the first side of the chassis and a second track assembly operably coupled to the drive assembly on the second side of the chassis. In some cases, (3) the first and second wheels may be directly connected to the drive assembly, and the first and second track assemblies may be indirectly connected to the drive assembly via an adaptation assembly. In some examples, (4) the adaptation assembly further includes a height adjuster. The height adjuster may be disposed between the chassis and a mobility assembly frame to which the first and second track assemblies are operably coupled. In an example embodiment, (5) the height adjuster may include a gas cylinder disposed between a rear wall of the mobility assembly frame and the chassis. In such an example, (6) the adaptation assembly may include a track gear and a transmission gear. The transmission gear may be operably coupled to a drive shaft of the drive assembly to transfer power from the power unit to the track gear, and the track gear may turn a respective one of the first and second track assemblies. In some examples, (7) the track gear and the transmission gear may be supported by a mobility assembly frame. The mobility assembly frame may be pivotally coupled to the chassis via a first pivot bearing disposed proximate to the track gear. A second track gear and second transmission gear may be supported on an opposing side of the mobility assembly frame. The opposing side of the mobility assembly frame may further include a second pivot bearing disposed proximate to the second track gear to pivotally couple the mobility assembly frame to the chassis. In an example embodiment, (8) the track gear may be operably coupled to a track wheel of the respective one of the first and second track assemblies via a stub shaft that passes through a sidewall of the mobility assembly frame.

In some embodiments, any or all of the modifications of (1) to (8) may be employed and the first and second wheels may be configured to be retained on respective drive shafts of the drive assembly via first retaining members. Removal of the first retaining members may allow removal of the first and second wheels. The transmission gear and the second transmission gear may be retained on the respective drive shafts via second retaining members. Additionally or alternatively, the first and second wheels may be mounted on a hub or sleeve via which the first retaining members engage the respective drive shafts. The transmission gear and the second transmission gear may be mounted on hub sleeves via which the second retaining members engage the respective drive shafts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A walk-behind, powered device comprising:

a power unit;

a chassis supporting the power unit;

a working assembly operably coupled to the power unit to perform a working function responsive at least in part to operation of the power unit; and a drive assembly configured to transfer power to a first mobility assembly to provide mobility of the powered device, wherein the first mobility assembly is removable and replaceable with a second mobility assembly, the second mobility assembly being a different type of mobility assembly than the first mobility assembly, wherein the second mobility assembly is indirectly connected to the drive assembly via an adaptation assembly, and wherein the adaptation assembly further comprises a height adjuster, the height adjuster being disposed between the chassis and a mobility assembly frame to adjust an orientation of the chassis relative to the mobility assembly frame.

2. The powered device of claim 1, wherein the first mobility assembly comprises a first wheel operably coupled to the drive assembly on a first side of the chassis and a second wheel operably coupled to the drive assembly on a second side of the chassis.

3. The powered device of claim 2, wherein the second mobility assembly comprises a first track assembly operably coupled to the drive assembly on the first side of the chassis and a second track assembly operably coupled to the drive assembly on the second side of the chassis.

4. The powered device of claim 2, wherein the first and second wheels are directly connected to the drive assembly.

5. The powered device of claim 1, wherein the height adjuster comprises a gas cylinder disposed between a rear wall of the mobility assembly frame and the chassis.

6. The powered device of claim 4, wherein the adaptation assembly comprises a track gear and a transmission gear, wherein the transmission gear is operably coupled to a drive shaft of the drive assembly to transfer power from the power unit to the track gear, and wherein the track gear turns a respective one of the first and second track assemblies.

7. The powered device of claim 6, wherein the track gear and the transmission gear are supported by a mobility assembly frame, and wherein the mobility assembly frame is pivotally coupled to the chassis via a first pivot bearing disposed proximate to the track gear, and wherein a second track gear and second transmission gear are supported on an opposing side of the mobility assembly frame, the opposing side of the mobility assembly frame further comprising a second pivot bearing disposed proximate to the second track gear to pivotally couple the mobility assembly frame to the chassis.

8. The powered device of claim 7, wherein the track gear is operably coupled to a track wheel of the respective one of the first and second track assemblies via a stub shaft that passes through a sidewall of the mobility assembly frame.

9. The powered device of claim 7, wherein the first and second wheels are configured to be retained on respective drive shafts of the drive assembly via first retaining members, wherein removal of the first retaining members allows removal of the first and second wheels, and wherein the transmission gear and the second transmission gear are retained on the respective drive shafts via second retaining members.

10. The powered device of claim 9, wherein the first and second wheels are mounted on a hub or sleeve via which the first retaining members engage the respective drive shafts, and wherein the transmission gear and the second transmission gear are mounted on hub sleeves via which the second retaining members engage the respective drive shafts.

11. A replacement mobility assembly for a walk-behind, powered device, the powered device being provided with an original mobility assembly that is to be removed from operable coupling with a drive assembly and a chassis of the powered device prior to installation of the replacement mobility assembly, the replacement mobility assembly comprising:

a first drivable component and a second drivable component, each of which are of a different type than corresponding drivable components of the original mobility assembly;

a mobility assembly frame to which the first and second drivable components are operably coupled; and an adaptation assembly configured to enable the mobility assembly frame to be operably coupled to the chassis and the first and second drivable components to be operably coupled to the drive assembly, wherein the first and second drivable components are indirectly connected to the drive assembly via the adaptation assembly, and wherein the adaptation assembly further comprises a height adjuster, the height adjuster being disposed between the chassis and the mobility assembly frame to adjust an orientation of the chassis relative to the mobility assembly frame.

12. The replacement mobility assembly of claim 11, wherein the original mobility assembly comprises a first wheel operably coupled to the drive assembly on a first side of the chassis and a second wheel operably coupled to the drive assembly on a second side of the chassis.

13. The replacement mobility assembly of claim 12, wherein the first drivable component comprises a first track assembly operably coupled to the drive assembly on the first side of the chassis and the second drivable component comprises a second track assembly operably coupled to the drive assembly on the second side of the chassis.

14. The replacement mobility assembly of claim 13, wherein the first and second wheels are directly connected to the drive assembly prior to removal.

15. The replacement mobility assembly of claim 11, wherein the height adjuster comprises a gas cylinder disposed between a rear wall of the mobility assembly frame and the chassis.

16. The replacement mobility assembly of claim 14, wherein the adaptation assembly comprises a track gear and a transmission gear, wherein the transmission gear is operably coupled to a drive shaft of the drive assembly to transfer power from a power unit of the powered device to the track gear, and wherein the track gear turns a respective one of the first and second track assemblies.

17. The replacement mobility assembly of claim 16, wherein the track gear and the transmission gear are supported by the mobility assembly frame, and wherein the mobility assembly frame is pivotally coupled to the chassis via a first pivot bearing disposed proximate to the track gear, and wherein a second track gear and second transmission gear are supported on an opposing side of the mobility assembly frame, the opposing side of the mobility assembly frame further comprising a second pivot bearing disposed proximate to the second track gear to pivotally couple the mobility assembly frame to the chassis.

18. The replacement mobility assembly of claim 17, wherein the track gear is operably coupled to a track wheel of the respective one of the first and second track assemblies via a stub shaft that passes through a sidewall of the mobility assembly frame.

19. The replacement mobility assembly of claim 16, wherein the first and second wheels are configured to be retained on respective drive shafts of the drive assembly via first retaining members, wherein removal of the first retaining members allows removal of the first and second wheels, and wherein the transmission gear and the second transmission gear are retained on the respective drive shafts via second retaining members.

20. The powered device of claim 19, wherein the first and second wheels are mounted on a hub or sleeve via which the first retaining members engage the respective drive shafts, and wherein the transmission gear and the second transmission gear are mounted on hub sleeves via which the second retaining members engage the respective drive shafts.

21. An adaptation assembly for a replacement mobility assembly for a walk-behind, powered device, the powered device being provided with an original mobility assembly that is to be removed from coupling with a drive assembly and a chassis of the powered device prior to installation of the replacement mobility assembly, the adaptation assembly comprising:

a first track gear and a second track gear operably coupled to respective ones of a first drivable component and a second drivable component of the replacement mobility assembly;

a first transmission gear and a second transmission gear operably coupled to respective portions of the drive assembly to transfer power from a power unit of the powered device to the first and second track gears, respectively; and a mobility assembly frame to which the first and second drivable components, the first and second track gears, and the first and second transmission gears are operably coupled, wherein the adaptation assembly is configured to enable the mobility assembly frame to be operably coupled to the chassis and the first and second drivable components to be operably coupled to the drive assembly, and wherein the adaptation assembly further comprises a height adjuster, the height adjuster being disposed between the chassis and the mobility assembly frame to adjust an orientation of the chassis relative to the mobility assembly frame.

22. The adaptation assembly of claim 21, wherein the height adjuster comprises a gas cylinder disposed between a rear wall of the mobility assembly frame and the chassis.

23. The adaptation assembly of claim 22, wherein the mobility assembly frame is pivotally coupled to the chassis via a first pivot bearing disposed proximate to the first track gear and a second pivot bearing disposed proximate to the second track gear.

24. The adaptation assembly of claim 23, wherein the first and second track gears are operably coupled to corresponding track wheels of the first and second track assemblies via respective stub shafts that pass through corresponding side-walls of the mobility assembly frame.

* * * * *